United States Patent [19]

Spataro

[11] Patent Number: 4,964,028

[45] Date of Patent: Oct. 16, 1990

[54] CURRENT LIMITED QUASI-RESONANT VOLTAGE CONVERTING POWER SUPPLY

[75] Inventor: Vincent J. Spataro, Bergenfield, N.J.

[73] Assignee: Plessey Electronic Systems Corp., Wayne, N.J.

[21] Appl. No.: 426,729

[22] Filed: Oct. 26, 1989

[51] Int. Cl.[5] .......................................... H02M 3/335
[52] U.S. Cl. .................................... 363/056; 363/021
[58] Field of Search ....................... 363/16, 20, 21, 95, 363/97, 131, 56

[56] References Cited

U.S. PATENT DOCUMENTS

| | | | |
|---|---|---|---|
| 4,616,300 | 10/1986 | Santelmann, Jr. ..................... | 363/21 |
| 4,631,652 | 12/1986 | Wendt .................................. | 363/16 |
| 4,709,316 | 11/1987 | Ngo et al. ............................. | 363/21 |
| 4,866,367 | 9/1989 | Ridley et al. ......................... | 363/21 |

OTHER PUBLICATIONS

K. H. Liu et al.; "Resonant Switches—Topologies and Characteristics"; presented at Power Electronic Specialists Conference, Toulouse, France, June 24–28, 1985.

K. H. Liu et al.; "Secondary—Side Resonance for High-Frequency Power Conversion"; presented at IEEE Applied Power Elec. Conference, New Orleans, LA, 4/28/86–5/1/86.

Primary Examiner—Peter S. Wong
Attorney, Agent, or Firm—David L. Davis

[57] ABSTRACT

A voltage converting power supply having current limiting characteristics wherein a flyback converter is operated in a load dependent half-wave mode. Constant pulse width switching at a variable rate is utilized for regulation and, by setting the maximum switching frequency, current limiting is achieved.

2 Claims, 3 Drawing Sheets

CURRENT LIMITED QUASI-RESONANT VOLTAGE CONVERTING POWER SUPPLY

BACKGROUND OF THE INVENTION

This invention relates to power supplies and, more particularly, to a power supply which is designed to be inherently current limiting without requiring additional circuit components to effect that function.

There are many application where a circuit board has its own on-board power supply for providing a DC to DC voltage conversion function. In addition, larger power supplies usually require a small "housekeeping", or bias, supply to provide start up and control power for the larger supply. Such a converter might typically accept a 28 volt DC input and produce a 5 watt output at 12 volts DC. In such applications, the load is relatively constant. However, it is desirable to provide current limiting in the event of a heavier load or a short circuit. Accordingly, it is a primary object of this invention to provide a voltage converting power supply having a current limiting characteristic.

SUMMARY OF THE INVENTION

The foregoing and additional objects are attained in accordance with the principles of this invention by providing a voltage converting power supply having current limiting characteristics comprising input means for receiving electrical power at an input voltage, output means for providing electrical power at an output voltage, controllable switch means for effecting the transfer of power from the input means to the output means, wherein the amount of power being transferred is dependent on the frequency of switch closure, and control means for controlling the switch means including means for providing a reference voltage, means for comparing the output voltage with the reference voltage and providing a comparison signal representative of the difference therebetween, means utilizing the comparison signal for controlling the frequency of switch closure to maintain the output voltage at the level of the reference voltage, and means for limiting the maximum frequency of switch closure.

In accordance with an aspect of this invention the control means further includes means for operating the switch means in a half-wave mode.

In accordance with an aspect of this invention the control means effects switch closure at a variable rate and wherein each switch closure is for a fixed time.

In accordance with an aspect of this invention the output means includes a flyback converter.

BRIEF DESCRIPTION OF THE DRAWING

The foregoing will be more readily apparent upon reading the following description in conjunction with the drawing wherein.

DETAILED DESCRIPTION

In accordance with the principles of this invention, a small 1.5 megahertz quasi-resonant flyback power supply was developed for "housekeeping" or "on-board" applications. This power supply achieves overcurrent protection without requiring any additional components to effect that function. The supply is designed to operate from a nominal +28 volts DC input and produce a 5 watt output at +12 volts DC. A zero current switching quasiresonant flyback converter topology, operating in the half-wave conduction mode, was chosen for this application. This topology looks similar to a conventional flyback converter except that it utilizes a capacitor on the transformer secondary side which forms a resonant LC tank with the leakage inductance of the primary side of the power transformer. This results in a configuration where the quasi-sinusoidal primary current starts out from zero when the transistor switch is turned on, and returns to zero before the switch is turned off - hence the name zero current switching. The resultant switch is lossless, since the switch never sees voltage and current simultaneously. Normally, a quasiresonant converter can be operated in two modes - either the half-wave mode where the switch is allowed to conduct in only one direction, or the full-wave mode where a bidirectional switch is used. It is generally considered a disadvantage to run in a half-wave mode since the DC transfer function in this mode is load dependent. However, in the case of a housekeeping supply, for example, where the load is relatively constant, the present invention uses the half-wave mode to provide inherent current limiting for the converter without the use of any additional circuitry.

Figure 1:
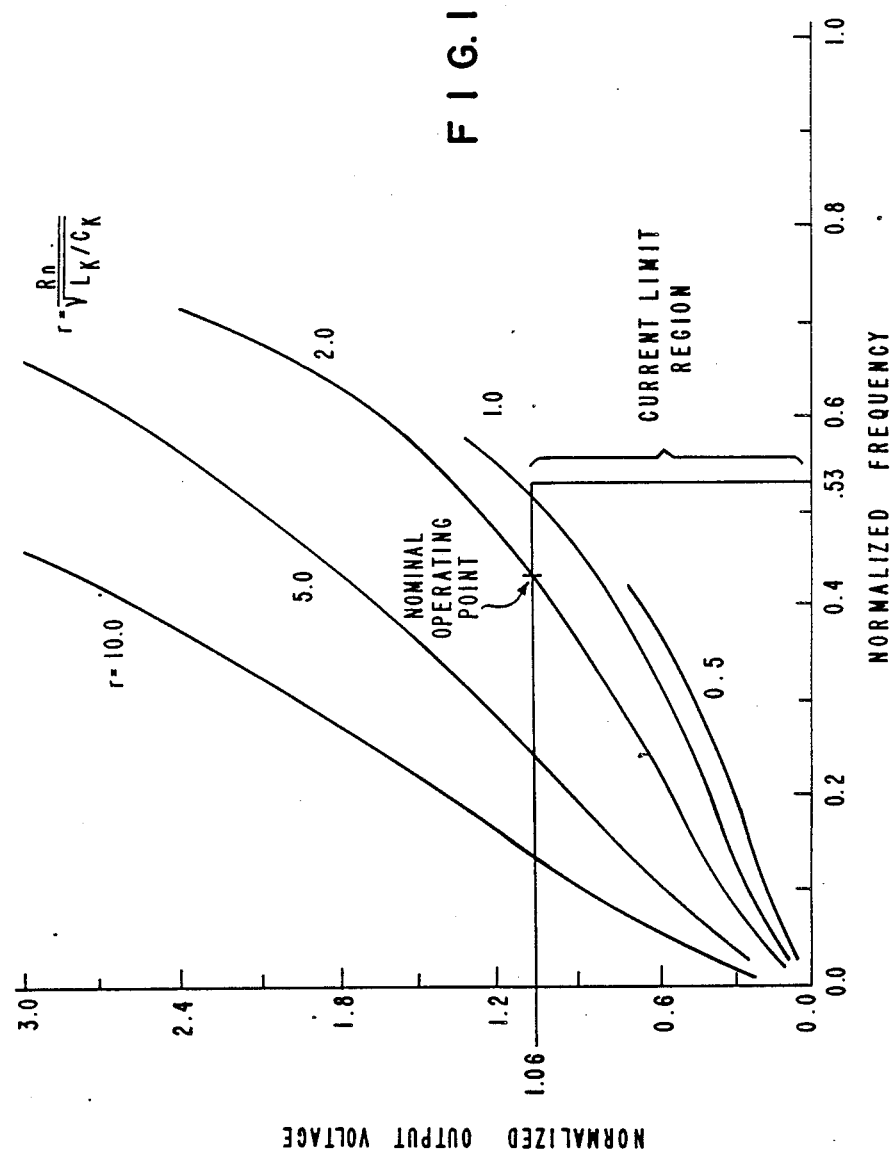
FIG. 1 is a graph of the DC transfer function of a quasi-resonant flyback converter operating in the half wave mode.

FIG. 1 illustrates the manner in which the circuit according to this invention provides overcurrent protection without the need for additional circuitry. This figure illustrates the DC transfer function of a quasi-resonant flyback converter. The ordinate is the normalized output voltage, which is equal to the transformer turns ratio times the output voltage divided by the input voltage, where the transformer turns ratio is the number of primary turns divided by the number of secondary turns. The abscissa is the normalized frequency, which is the switching frequency divided by the resonant frequency of the LC tank at the output of the converter. Illustratively, this resonant frequency is 1.5 megahertz. Different curves are plotted for different values of "r", which is a function of load resistance, the transformer turns ratio, and the characteristic impedance of the resonant tank. The equation for the parameter r is shown in FIG. 1, where R is the load resistance, n is the transformer turns ratio, $L_K$ is the leakage inductance and $C_K$ is the secondary capacitance reflected to the primary side and is equal to the output capacitor divided by the square of the turns ratio. Smaller values of the parameter r indicate heavier loading.

Figure 2:
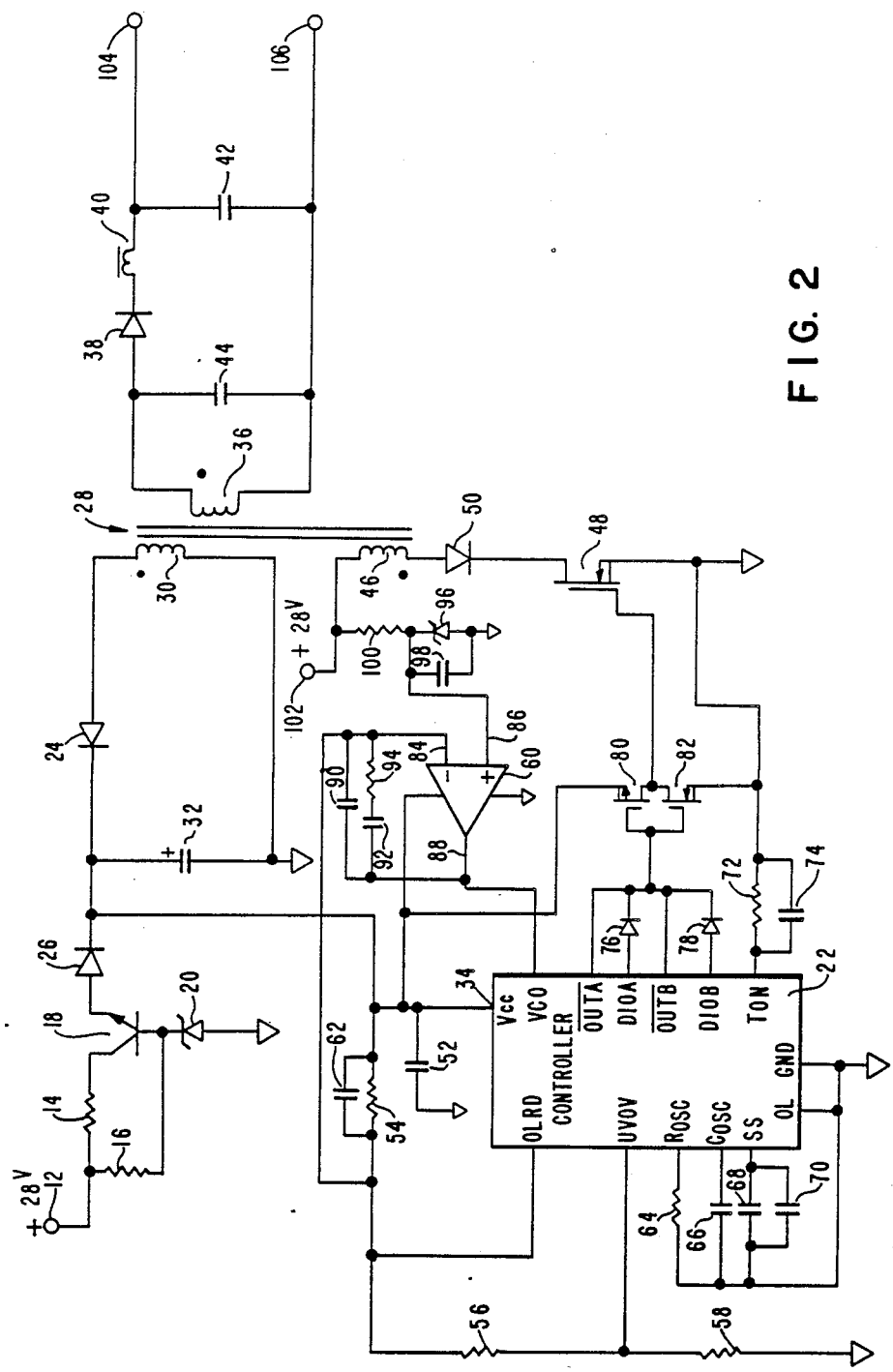
FIG. 2 is a schematic diagram of illustrative circuitry constructed in accordance with the principles of this invention.

As will become apparent from reading the details of the circuit operation, in normal operation, the circuit of FIG. 2 maintains regulation by means of the controller section varying the switching frequency to maintain an operating point along the load line where the normalized output voltage illustratively equals 1.06. The frequency varies about the nominal operating point along this line in such a manner that the frequency drops below the nominal operating frequency of 600 kilohertz (normalized frequency of 0.4) for light loads (larger values of r) and rises above 600 kilohertz for heavier loads (smaller values of r). The load may be increased until the normalized frequency reaches 0.53, indicated by the vertical line in FIG. 1. This corresponds to an operating frequency of 800 kilohertz, which is the maximum frequency that the controller can support. If the load is increased further, the operating point no longer follows the horizontal load line since the frequency can go no higher. Instead, the path is now along the vertical line where the abscissa is 0.53 and the voltage, along with the output current, starts to drop as the load continues to increase. Thus, the circuitry automatically provides for overcurrent protection for the output as well as the power switch, and will perform satisfactorily down to a short circuit. In fact, as will be described hereinafter, the peak switch current in the short circuit case is only 1.2 times the nominal current.

FIG. 2 illustrates circuitry constructed in accordance with the principles of this invention which operates as a voltage converting power supply with current limiting characteristics. The circuitry shown in FIG. 2 includes a small start up circuit where the input +28 volts supply is applied to the terminal 12 and through the resistor divider network consisting of the resistors 14 and 16 to the pass transistor 18. The Zener diode 20 sets the nominal 12 volts reference on the base of the transistor 18. That provides initial start up current to run the controller chip 22, which is illustratively a LD405 resonant mode power supply controller manufactured by Linear Technology Inc. of Ontario, Canada. When power comes up, current flows through the diode 24 and back biases the diode 26 so that the start up circuit is no longer effective. Upon this occurring, power is supplied from the transformer 28 via the secondary winding 30. Current flows from the winding 30 through the diode 24, is filtered by the capacitor 32 and is connected to the supply voltage terminal 34 of the controller chip 22. Thus, initially the start up circuit provides power to the controller chip 22 and then afterwards power is provided via the winding 30 of the transformer 28.

The secondary winding 36 of the transformer 28 is the output winding, the diode 38 is the output rectifier, the inductor 40 is the output filter inductor, the capacitor 42 is the output filter capacitor, and the capacitor 44 is the resonant capacitor which resonates with the leakage reactance of the transformer 28. The winding 46 is the main primary winding of the transformer 28 and is energized by switching on and off the transistor 48. The diode 50 prevents conduction in a reverse direction and insures operation in the half-wave mode.

A description of the remainder of the circuit components is as follows. The capacitor 52 is a filter capacitor which provides filtering of the input voltage to the controller chip 22. The resistors 54, 56, and 58 are divider resistors that set the regulation point that comes into the controller chip 22 and goes to the error amplifier 60. The resistors 56 and 58 also set an over voltage/under voltage shut down point for the controller chip 22. The capacitor 62 in parallel with the resistor 54 is part of the compensation network.

The resistor 64 is the timing resistor and the capacitor 66 is the oscillator capacitor. Together, the resistor 64 and the capacitor 66 set the nominal operating frequency of the controller chip 22. The capacitors 68 and 70 are parallel capacitors used to set the soft start so that the circuitry starts up in an orderly manner and just doesn't come on too quickly, which could over stress the circuit components. The circuitry starts out at a low voltage and ramps up within a short period of time-less than a millisecond.

The resistor 72 and the capacitor 74 together set the on time for the output pulses of the controller chip 22. The diodes 76 and 78 prevent saturation of the driver transistors internal to the controller chip 22. They are also connected to the gates of the transistors 80 and 82, a P and N channel pair which provide the drive to the main power transistor 48.

The error amplifier 60 accepts at its inverting input 84 a signal representative of the output voltage and compares it to a reference voltage applied to its noninverting input 86. The output of the error amplifier 60 on the lead 88 is, accordingly, an error signal that is proportional to the difference between the output and reference voltages. The capacitors 90 and 92 and the resistor 94 are part of the compensation network, as is the capacitor 62. The reference voltage applied to the non-inverting input 86 of the error amplifier 60 comes from the network including the Zener diode 96, the filter capacitor 98, and the resistor 100. The resistor 100 is connected to the +28 volts input and supplies current to the Zener diode 96, which provides the reference voltage to which the output voltage is compared.

The operation of the circuitry shown in FIG. 2 is as follows. Input power at +28 volts DC is applied to the winding 46 via the terminal 102 and also to the start up circuitry which includes the transistor 18. Initially, the transistor 18 conducts and provides start up current to the controller chip 22. During that time, the transistor 48 begins to turn on and the current in the transistor 48 ramps up in a quasi-sinusoidal fashion as shown in FIG. 3B. The current then falls to zero at a frequency determined by the resonant capacitor 44 and the leakage inductance of the transformer 28. After a period of time, the process repeats again with the transistor 48 turning back on. The switching frequency is controlled in accordance with the output voltage sensed across the terminals 104 and 106, which is nominally 12 volts DC. This is accomplished indirectly by the tightly coupled winding 30 of the transformer 28 which is coupled to the secondary winding 36. A voltage is generated across the capacitor 32 which is applied to the inverting input 84 of the error amplifier 60 through the parallel combination of the resistor 54 and the capacitor 62. This voltage is compared with the reference voltage applied to the non-inverting input 86 of the error amplifier 60. If the voltage on the lead 84 is less than the voltage on the lead 86, then the transistor 48 is signaled by the controller chip 22 to turn on at a higher frequency. Conversely, if the voltage on the lead 84 is greater than the voltage on the lead 86, then the transistor 48 is controlled to turn on at a lesser frequency. Since the controller chip 22 operates to provide a constant width pulse for controlling the transistor 48, controlling the turn on frequency of the transistor 48 provides regulation of the output.

Previously, it was conventional to operate circuitry of the type shown in FIG. 2 in the full-wave conduction mode in which the transfer function is not load dependent. In other words, for full-wave mode operation, the transfer function of the output voltage versus frequency is one curve, which is totally load independent. Conversely, according to the present invention, the circuitry shown in FIG. 2 is operated in the half-wave mode in which the transfer function curves are dependent upon the load. As shown in FIG. 1, there is a series of curves, one for every variation in load. This implementation is highly advantageous in that it provides current limiting, without the use of any additional components. In summary, the circuitry operates generally along some horizontal line as shown in FIG. 1 that spans the range of loads which it is anticipated will be encountered. If the load is increased beyond a set current limit point, the controller chip 22 cannot increase its frequency. The maximum frequency of the controller chip is determined by selecting appropriate values of the resistor 64 and the capacitor 66.

Figure 3A:
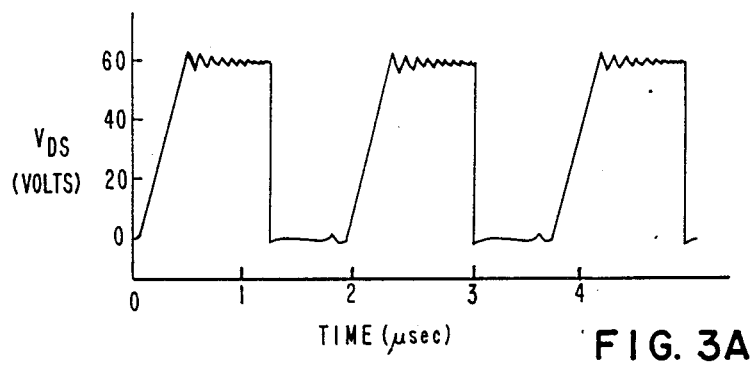
FIGS. 3A and 3B show the normal switching waveforms for voltage and current, respectively, in the circuitry of FIG. 2 for a nominal 5 watt load.
Figure 3B:
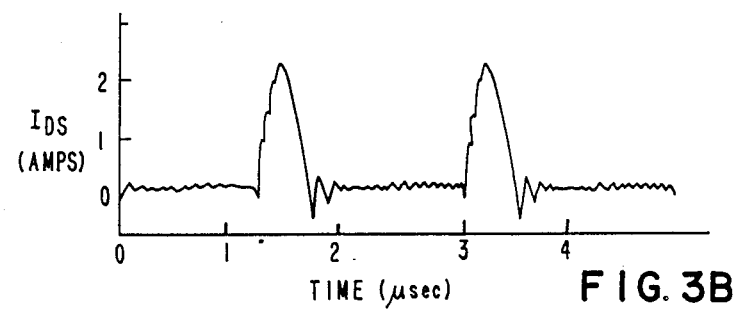
Figure 4A:
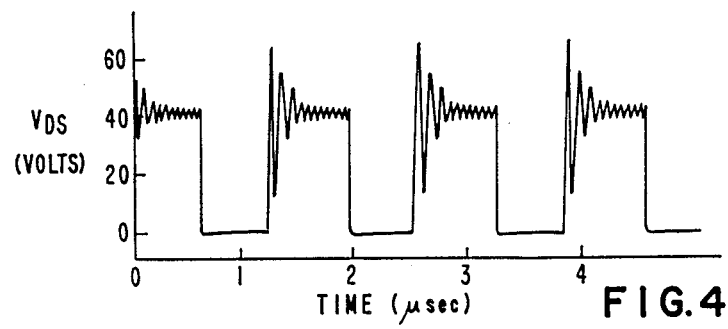
FIGS. 4A and 4B are similar to FIGS. 3A and 3B, respectively, but under a short circuit condition.
Figure 4B:
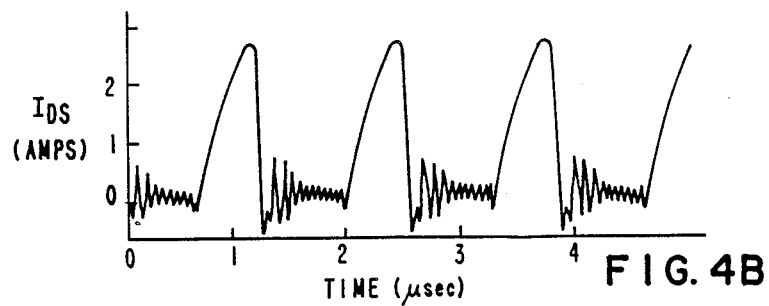

FIGS. 3A and 3B illustrate the normal switching waveforms for a nominal 5 watt load. FIG. 3A shows the drain to source voltage for the field effect transistor 48 and FIG. 3B shows the drain current for the transistor 48. The zero current switching property is clearly evident. FIGS. 4A and 4B show the same voltage and current waveforms for the circuitry under a short circuit condition. The zero current switching property is lost, but the peak transistor drain current remains well controlled and is limited to a safe value of only 1.2 times the nominal full load current. It has been found that the circuitry recovers immediately after the short circuit is removed.

Accordingly, there has been disclosed an improved voltage converting power supply having current limiting characteristics. While an illustrative embodiment of the present invention has been disclosed herein, it will be apparent to those of ordinary skill in the art that various modifications and adaptations to that embodiment are possible and it is only intended that the present invention be limited by the scope of the appended claims. Thus, for example, although a flyback converter topology has been illustrated, the aforedescribed principles of operation may be applied to a wide range of quasi-resonant converters and other frequency controlled converters with load dependent transfer functions. These may include resonant variations of the buck, boost and buck-boost topologies.

I claim:

1. A voltage converting power supply having current limiting characteristics comprising:
    input means for receiving electrical power at an input voltage;
    output means including a flyback converter for providing electrical power at an output voltage;
    controllable switch means for providing a current path to effect the transfer of power from said input means to said output means, wherein said switch means is controllable to provide said current path at a variable frequency and the amount of power being transferred is dependent on the frequency at which said current path is provided; and control means for controlling said switch means including:
    means for providing a reference voltage;
    means for comparing said output voltage with said reference voltage and providing a comparison signal representative of the difference therebetween;
    means utilizing said comparison signal for controlling the frequency at which said current path is provided to maintain said output voltage equal to said reference voltage;
    means for operating said switch means in a half-wave mode; and
    means for limiting the maximum frequency at which said current path is provided.

2. A power supply according to claim 1 wherein said control means effects the provision of said current path at a variable rate and wherein each provision of said current path is for a fixed time.

* * * * *